United States Patent
Hiramatsu et al.

(10) Patent No.: US 12,287,036 B2
(45) Date of Patent: Apr. 29, 2025

(54) VALVE

(71) Applicant: FUJIKIN INCORPORATED, Osaka (JP)

(72) Inventors: Koji Hiramatsu, Osaka (JP); Tomohiro Mouri, Osaka (JP); Tomoya Kanzaki, Osaka (JP); Tadayuki Yakushijin, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 82 days.

(21) Appl. No.: 17/921,685

(22) PCT Filed: Apr. 23, 2021

(86) PCT No.: PCT/JP2021/016483
§ 371 (c)(1),
(2) Date: Oct. 27, 2022

(87) PCT Pub. No.: WO2021/220963
PCT Pub. Date: Nov. 4, 2021

(65) Prior Publication Data
US 2023/0160478 A1    May 25, 2023

(30) Foreign Application Priority Data

Apr. 28, 2020 (JP) .................. 2020-078892
Dec. 25, 2020 (JP) .................. 2020-216537

(51) Int. Cl.
F16K 1/46 (2006.01)
F16J 15/56 (2006.01)
F16K 41/06 (2006.01)

(52) U.S. Cl.
CPC .............. F16K 1/46 (2013.01); F16J 15/56 (2013.01); F16K 41/06 (2013.01)

(58) Field of Classification Search
CPC . F16K 1/46; F16K 41/06; F16K 41/04; F16K 27/02; F16J 15/56; F16J 15/3236
(Continued)

(56) References Cited

U.S. PATENT DOCUMENTS 4,230,299 A * 10/1980 Pierce, Jr. ............. F16K 43/008
                                                    251/282
4,394,023 A *  7/1983 Hinojosa ................. F16K 41/02
                                                    251/214
(Continued)

FOREIGN PATENT DOCUMENTS

JP      S58-178076 A    10/1983
JP      2016-14405 A     1/2016
(Continued)

OTHER PUBLICATIONS

International Search Report mailed Jul. 27, 2021, issued for PCT/JP2021/016483 and its English translation.

*Primary Examiner* — Craig M Schneider
*Assistant Examiner* — Andrew J Rost
(74) *Attorney, Agent, or Firm* — Troutman Pepper Locke LLP

(57) ABSTRACT

Provided is a valve with which a seal member is not damaged when pressure accumulated near the seal member is released. This valve includes a valve box having a valve chamber, a valve seat provided in the valve chamber and having a seat surface, a stem including, at a tip end thereof, a valve element configured to abut against and move away from the seat surface due to an operation of an actuator, a seal space provided with a seal member configured to prevent a fluid from leaking, a seal opening space formed outside the seal space, and a seal pressing member configured to press and fix the seal member to a valve chamber (Continued)

side. The valve box is formed with a leak hole through which the seal space and the outside of the valve box communicate.

5 Claims, 16 Drawing Sheets

(58) Field of Classification Search
USPC .......................................................... 251/214
See application file for complete search history.

(56) References Cited

U.S. PATENT DOCUMENTS

| | | | |
|---|---|---|---|
| 4,509,719 A | | 4/1985 | Uomala et al. |
| 4,640,305 A | * | 2/1987 | Johnson ................. F16J 15/186 |
| | | | 137/315.28 |
| 5,178,363 A | * | 1/1993 | Icenhower ............ F16K 41/026 |
| | | | 137/246.22 |
| 5,979,483 A | * | 11/1999 | Zapalac .................. F16K 41/02 |
| | | | 277/516 |
| 8,136,792 B2 | * | 3/2012 | King ....................... F16K 41/02 |
| | | | 277/516 |
| 8,308,131 B2 | * | 11/2012 | Gutmann .............. F16K 5/0647 |
| | | | 251/315.01 |
| 10,036,485 B2 | * | 7/2018 | Adams .................... F16K 31/12 |
| 2013/0161553 A1 | * | 6/2013 | Hunter ................ F16J 15/3236 |
| | | | 251/366 |

FOREIGN PATENT DOCUMENTS

| | | |
|---|---|---|
| JP | 2016-156442 A | 9/2016 |
| KR | 10-2018-0098716 A | 9/2018 |

\* cited by examiner

VALVE

TECHNICAL FIELD

The present invention relates to a valve that controls a flow of a fluid. The invention relates to the valve that controls a flow of a fluid, and more particularly, to a valve that is provided in a high-pressure flow passage and that requires retightening to a packing preventing a fluid from leaking from an annular gap between a stem and a bonnet.

BACKGROUND ART

A valve disclosed in PTL 1 is a needle valve type control valve for a high-pressure fluid, and a structure of the valve is a high-pressure needle valve in which a needle portion is moved up and down without rotation with respect to a valve seat in a body having an inflow port and an outflow port so as to be able to open and close or adjust a flow rate of the high-pressure fluid. The valve seat and the needle portion strongly abut against each other to block the fluid.

As a control valve that can adjust a flow rate of a fluid and perform opening and closing, a control valve described in PTL 2 is known. The control valve includes a valve body that has a flow passage for a fluid, a valve element that controls a flow rate of the fluid, and an actuator that moves the valve element up and down. When the valve is closed, an abutting portion of the valve element abuts against a valve seat formed in the valve body as the valve element is lowered by the actuator, thereby blocking the fluid. The valve element is strongly pressed against the valve seat facing the valve element by moving the valve element up and down without rotation, so that these control valves can withstand a high-pressure fluid.

CITATION LIST

Patent Literature

PTL 1: JP-A-2016-156442
PTL 2: JP-A-2016-014405

SUMMARY OF INVENTION

Technical Problem

In this type of valve, a seal member is provided to prevent a fluid from leaking outside from a space in which a stem moves. However, since an interior of a valve chamber is used at high pressure, a seal pressing member that presses the seal member to a valve chamber side may be loosened due to long-term use. In this case, although the seal pressing member is retightened to cope with this problem, pressure may be accumulated in the seal member on the valve chamber side. When the pressure is accumulated, a problem arises that it is not possible to tighten the seal pressing member to a predetermined position only by retightening with a predetermined tightening torque, and the retightening cannot be performed using a torque wrench having a set torque.

When sufficient retightening cannot be performed due to the accumulated pressure, the seal pressing member is once completely loosened, the accumulated pressure is released from an upper portion to the outside, and then tightening is performed again. Since the pressure is accumulated, the seal member is raised by loosening the seal pressing member, and pressure release is completed. However, a problem arises that such work requires time and effort and may damage the seal member.

In recent years, a valve in an environment in which a high-pressure fluid is controlled as a fluid to be controlled is required. In such an environment, when the valve is used as a discharge valve, a throttle may be provided as a noise countermeasure on a discharge side. By providing the throttle, the pressure is not released smoothly, and a stem side (seal member side) is affected. As a result, the seal pressing member that presses the seal member may be loosened.

FIG. 11A shows a state in which a seal pressing member 230 is screwed into a deep position. FIG. 11B shows a state in which the seal pressing member 230 is loosened but pressure of a high-pressure fluid in a valve chamber 214 is still maintained. Further, when a screw of the seal pressing member 230 is loosened, at a moment when a male screw of the seal pressing member 230 is disengaged, the high-pressure fluid in the valve chamber 214 may flow to an upper seal opening space (upper side with respect to a position P), and a scratch or the like that impairs seal performance may occur in an outer seal member 232 (see FIG. 11C).

FIG. 12A shows a state in which a seal pressing member 330 is screwed into a deep position, and a pressure accumulation portion P in which the high-pressure fluid is accumulated is formed in a gap space to a seal portion. In the seal portion, an inner seal member 331 and an outer seal member 332 abut against an outer peripheral surface of a stem 320 and an inner peripheral surface 319 of a seal space, respectively. FIG. 12B shows a state in which the seal pressing member 330 is loosened but pressure of the high-pressure fluid in a valve chamber 314 is still maintained. At this time, pressure in the pressure accumulation portion P is maintained. Further, when a screw of the seal pressing member 330 is loosened, a male screw of the seal pressing member 330 is disengaged, the high-pressure fluid in the valve chamber 314 and the pressure accumulation portion P may flow to an upper seal opening space at a moment when the outer seal member 332 and the inner peripheral surface 319 do not abut against each other, and a scratch or the like that impairs seal performance may occur in the outer seal member 332.

An object of the invention is to provide a valve with which a seal member is not damaged due to pressure release when pressure accumulated near the seal member is once released to the outside in order to retighten the seal member.

Solution to Problem

A valve according to Invention (1), which has been made to solve the above problems, includes: a valve box having a fluid inlet, a fluid outlet, and a valve chamber; a valve seat provided in the valve chamber and having a seat surface; a stem connected to an actuator and including, at a tip end of the stem, a valve element configured to abut against and move away from the seat surface due to an operation of the actuator; a seal space communicating with the valve chamber and provided with a seal member configured to prevent a fluid from leaking from the valve chamber; a seal opening space communicating with the seal space and formed outside the seal space; and a seal pressing member configured to press and fix the seal member to a valve chamber side. The valve box is formed with a leak hole through which the seal space and the outside of the valve box communicate. The seal member includes an outer seal member configured to prevent the fluid from leaking from an inner peripheral surface of the seal space and an inner seal member configured to prevent the fluid from leaking from an outer peripheral surface of the stem. The leak hole opens into the seal space that is nearer to the seal opening space than is a seal effective region in which the outer seal member is in close contact with a peripheral wall forming the seal space.

In the valve according to Invention (1), the valve box is formed with the leak hole through which the seal space and the outside of the valve box communicate, the seal member includes the outer seal member configured to prevent the fluid from leaking from the inner peripheral surface of the seal space and the inner seal member configured to prevent the fluid from leaking from the outer peripheral surface of the stem, and the leak hole opens into the seal space that is nearer to the seal opening space than is the seal effective region in which the outer seal member is in close contact with the peripheral wall forming the seal space. Therefore, a high-pressure fluid in the valve chamber is discharged from the leak hole before the outer seal member is exposed to the seal opening space. Since pressure in the valve chamber decreases, pressure in the seal space also decreases, so that a screw of the seal pressing member can be smoothly loosened, and the outer seal member is not damaged. In this way, retightening can be easily performed. Even when a throttle is provided as a noise countermeasure in the seal opening space, the retightening can be easily performed in the same manner.

A valve according to Invention (2), which has been made to solve the above problems, includes: a valve body having an inflow port and an outflow port for a fluid, and a valve chamber; a valve seat provided in the valve chamber and having a seat surface that is an open end of a flow passage communicating with the inflow port; a columnar stem connected to an actuator and including, at a tip end of the stem, a valve element configured to abut against and move away from the seat surface due to an operation of the actuator; a seal member provided in a stem insertion port that communicates with the outside from the valve chamber, fitted onto the stem, and configured to prevent the fluid from leaking from the valve chamber; and a seal pressing member configured to press and fix the seal member to a valve chamber side. The stem is formed with, in an assembled state, a pressure release portion that is nearer to the seal pressing member than is a position at which the seal member is in sliding contact.

In the valve according to Invention (2), an outer diameter of the pressure release portion at the stem may be smaller than an outer diameter of the other part of the stem.

In the valve according to Invention (2), the seal member fitted onto the stem moves along with the seal member by loosening the seal pressing member and reaches the pressure release portion of the stem, and the pressure accumulated near the seal member is released to the outside. Accordingly, the pressure accumulation between the seal members is eliminated, and the retightening can be easily performed. In addition, an outer seal member is not damaged.

The pressure release portion may be an inflow hole and an outflow hole that communicate with each other inside the stem. By setting the outflow hole to be nearer to the seal pressing member than be the inflow hole in an axial direction, the pressure in the pressure accumulation portion is released to the outside when an inner seal member is nearer to the seal pressing member than is the inflow hole.

In these cases, the seal member may be implemented by attaching the inner seal member and the outer seal member to a continuous cylindrical seal holding member having different outer diameters and inner diameters, and the inner seal member may be on an actuator side. Accordingly, it is possible to quickly complete the pressure release of the seal space.

Advantageous Effect

According to the valve in the invention, it is possible to provide a valve with which the seal member of the valve is not damaged due to pressure release when the pressure accumulated near the seal member is once released to the outside in order to retighten the seal member. Even when a throttle is provided as a countermeasure against noise, it is possible to provide a valve that can be easily retightened.

BRIEF DESCRIPTION OF DRAWINGS

FIGS. 7A, 7B and 7C show shows parts of the valve according to Invention (2), in which FIG. 7A is a front view of a partly cut-away portion of a stem, FIG. 7B is a sectional perspective view before a seal holding member and a seal member are attached, and FIG. 7C is a sectional perspective view of a partly cut-away portion showing a state in which the stem is fitted in the seal holding member. The seal member is attached to the seal holding member.

FIGS. 10A, 10B, 10C and 10D show shows another embodiment of the valve according to Invention (2), in which FIG. 10A is a front view of a partly cut-away portion of the stem, FIG. 10B is a sectional perspective view of a partly cut-away portion showing a state in which the stem is fitted in the seal holding member, and the seal member is attached to the seal holding member, FIG. 10C is a sectional perspective view of a partly cut-away portion showing a state in which the seal pressing member is loosened and a pressure release portion functions, and FIG. 10D is a sectional perspective view of a partly cut-away portion showing still another embodiment.

FIGS. 12A, 12B and 12C are schematic explanatory views showing pressure release of a seal member of a valve in the related art, in which FIG. 12A shows a state in which the seal member is fastened, FIG. 12B shows a state in which the seal member is slightly loosened, and FIG. 12C shows a state in which the seal member is opened.

DESCRIPTION OF EMBODIMENTS

Figure 1:
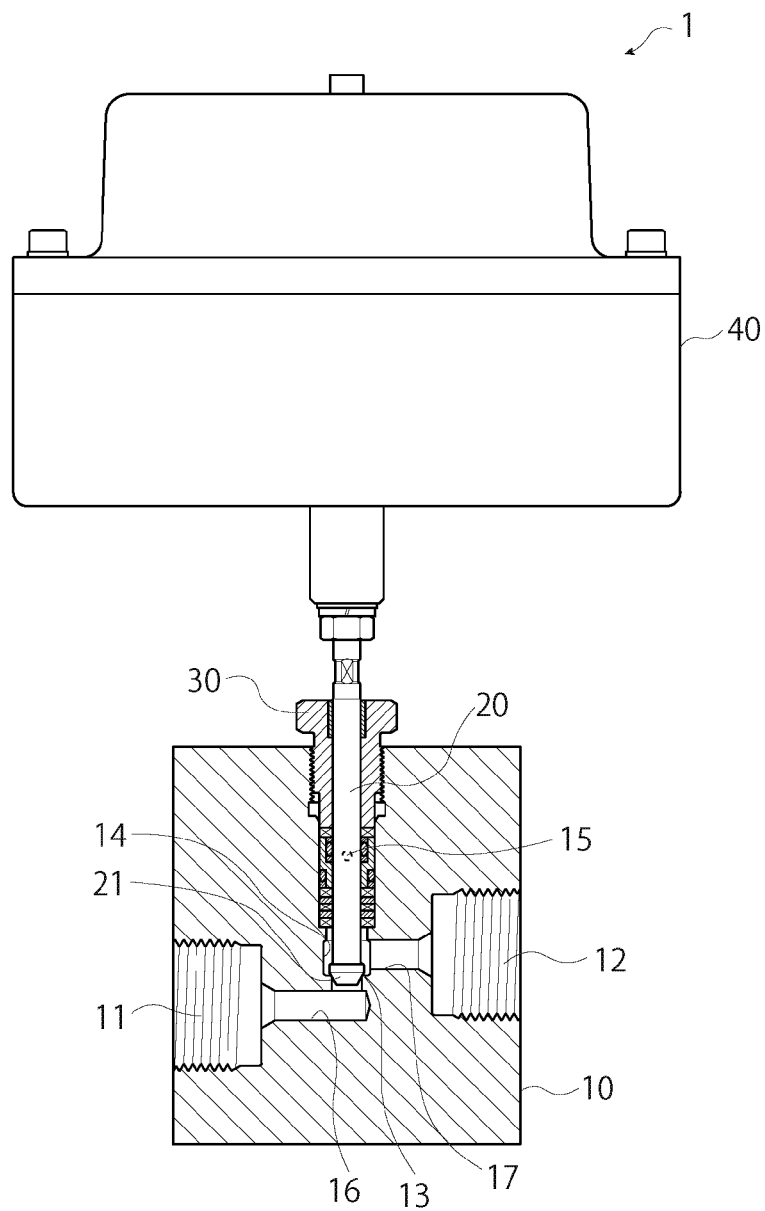
FIG. 1 is a front sectional view of a partly cut-away portion showing a valve according to Invention (1).

Hereinafter, preferred embodiments of a valve according to the invention will be described with reference to drawings. Shapes, relative arrangements, and the like of components described in the embodiments are not intended to limit the scope of the invention unless particularly specified, and are merely illustrative examples. In addition, directions of members and the like may be referred to as, for convenience, upper, lower, left, and right depending on directions in the drawings, and these directions do not limit the scope of the invention.

First Embodiment of Invention (1)

FIGS. 1 to 5 show a first embodiment of Invention (1). FIG. 1 is a front sectional view of a partly cut-away portion of a valve 1 according to Invention (1). A fluid inlet 11 into which a fluid flows and a fluid outlet 12 through which the fluid flows out are opened on an outer surface of a valve box 10 of the valve 1 according to Invention (1). A fluid inflow passage 16 is formed between a valve chamber 14 in which the fluid is controlled and the fluid inlet 11, and a fluid outflow passage 17 is formed between the valve chamber 14 and the fluid inlet 11. A valve seat 13 is formed on a lower surface of the valve chamber 14, and abuts against and moves away from a valve element 21 formed at a lower end of a stem 20 to control opening and closing of the fluid. A seal pressing member 30 that presses a seal is provided on an upper surface side of the valve box 10. An actuator 40 that drives the stem 20 up and down is provided above the valve box 10.

A leak hole 15 that is a characteristic portion according to Invention (1) is formed in the valve box 10, and is depicted by a dotted line.

Figure 2:
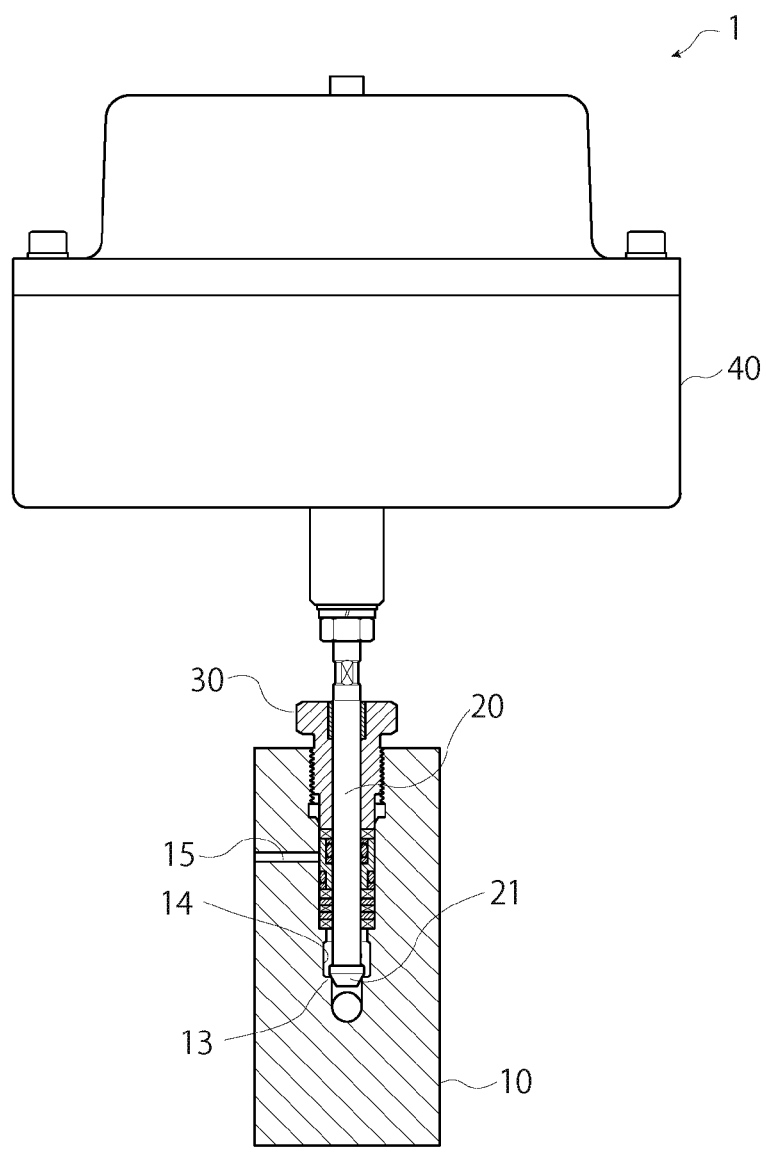
FIG. 2 is a side sectional view of a partly cut-away portion showing the valve according to Invention (1).

FIG. 2 is a side sectional view of a partly cut-away portion of the valve 1 according to Invention (1). The leak hole 15 is depicted by the dotted line in FIG. 1, whereas the leak hole 15 is depicted as a through hole passing through the inside of the valve box 10 in FIG. 2. Invention (1) is characterized in that the leak hole 15 is formed and in a formation position of the leak hole 15.

Figure 3:
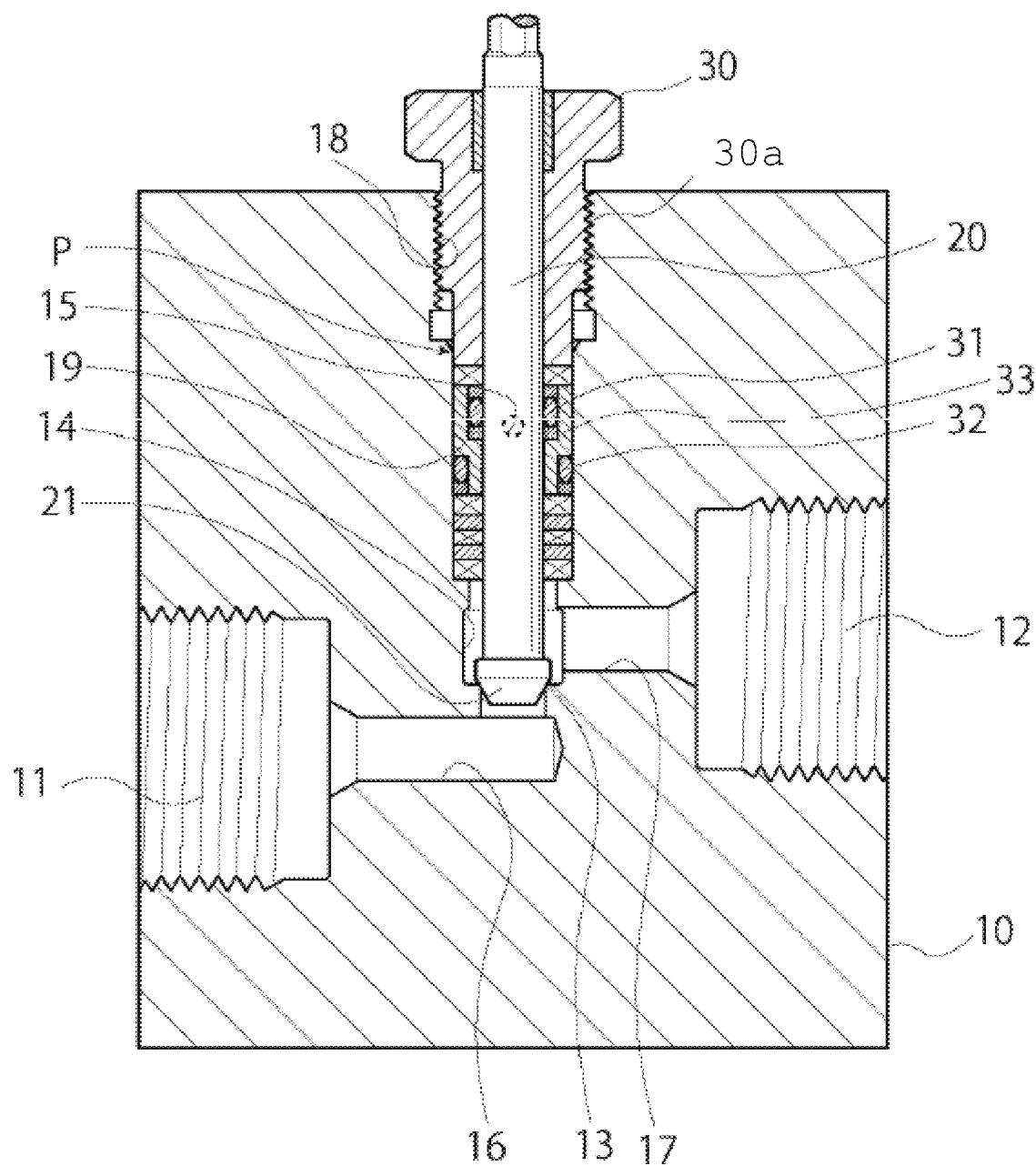
FIG. 3 is an enlarged front sectional view of a partly cut-away portion showing a state in which a seal pressing member of the valve according to Invention (1) is fastened.

FIG. 3 is an enlarged front sectional view of a partly cut-away portion showing a state in which the seal pressing member 30 is fastened to a prescribed position in the valve 1 according to Invention (1). A male screw 30a of the seal pressing member 30 is screwed into a female screw 18 formed in an upper portion of the valve box 10. An inner seal member 31 is provided around the stem 20 to prevent the fluid from leaking along the outer peripheral surface of the stem 20.

A tapered surface is formed above a position P. A space above the position P is a seal opening space. A space below the position P and above the valve chamber 14 is a seal space in which an outer seal member 32 is provided. The outer seal member 32 is in close contact with an inner peripheral wall 19 forming the seal space, to prevent the fluid from the valve chamber 14 from leaking along the inner peripheral wall 19 forming the seal space. The inner seal member 31 and the outer seal member 32 are provided in the seal space in a state in which the inner seal member 31 and the outer seal member 32 are provided in a continuous cylindrical seal holding member 33 having different outer diameters and inner diameters.

Figure 4:
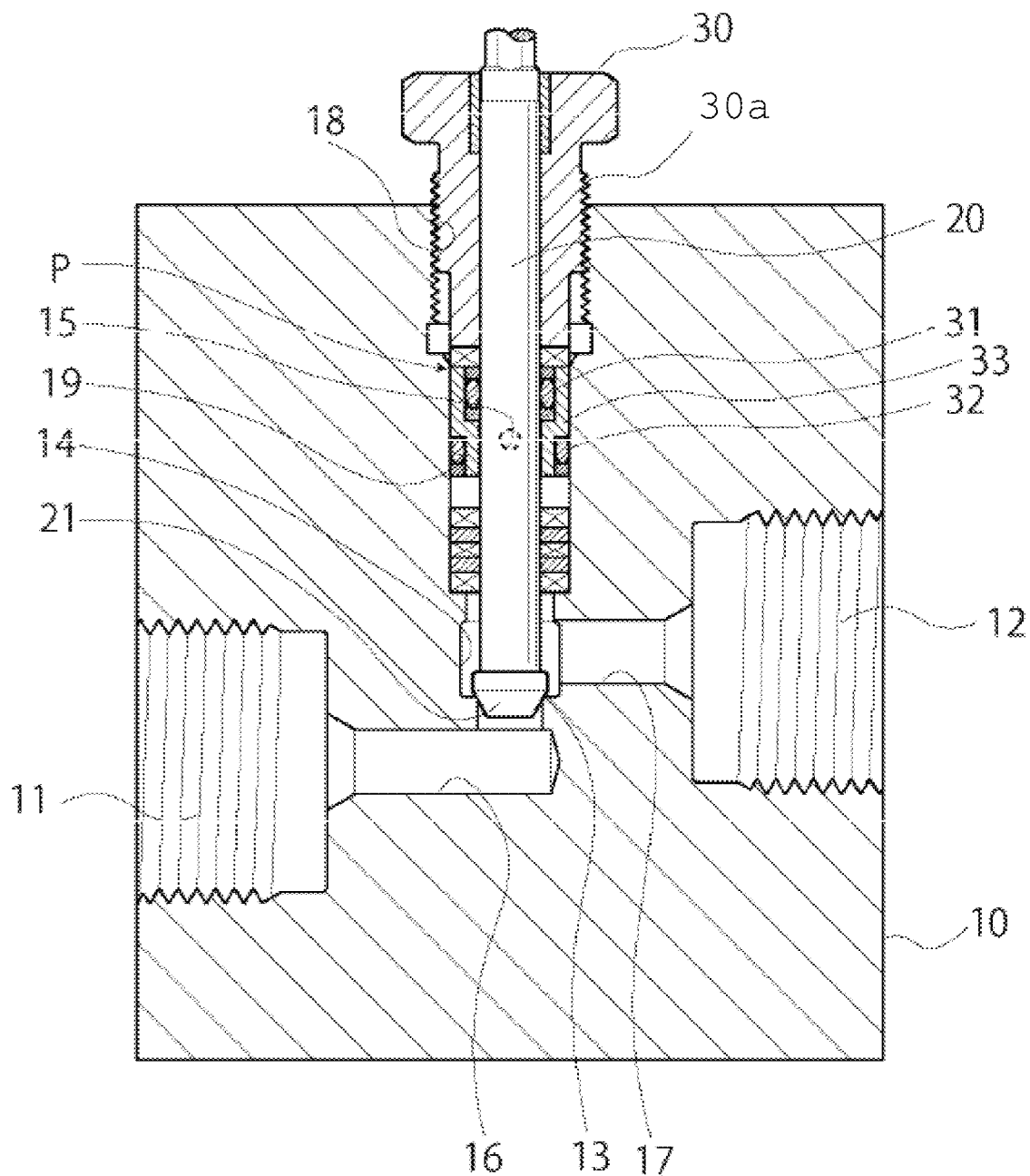
FIG. 4 is an enlarged front sectional view of a partly cut-away portion showing a state in which the seal pressing member of the valve according to Invention (1) is loosened.

FIG. 4 shows a state in which the seal member 31 and the seal member 32 move upward by loosening screwing of the male screw 30a of the seal pressing member 30. When the male screw 30a is loosened to this state, a high-pressure fluid in the valve chamber 14 is discharged from the leak hole 15 to the outside of the valve 1. Therefore, pressure in the valve chamber 14 decreases, and the male screw 30a of the seal pressing member 30 can be lightly loosened. In this state, since an outer periphery of the outer seal member 32 abuts against the inner peripheral wall 19 of the seal space, the outer seal member 32 is not damaged. Even when a throttle is provided as a noise countermeasure on a discharge side, the high-pressure fluid is easily discharged from the leak hole 15, and thus subsequent retightening can be easily performed.

The leak hole 15 is formed nearer to the valve box 14 than is a boundary P of the seal space and the seal opening space. Therefore, the high-pressure fluid can be leaked only by loosening the seal pressing member 30 and moving an upper portion of the outer seal member 32 to the position of the leak hole 15, and thus an amount of movement can be reduced and the work can be easily performed.

Figure 5:
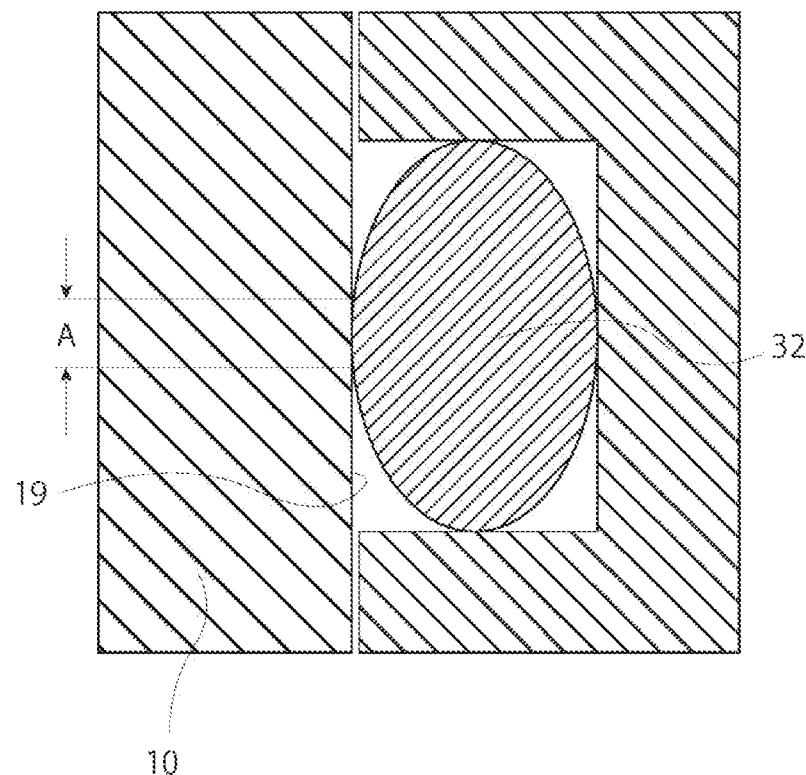
FIG. 5 is a cross-sectional view schematically showing a seal effective region of the valve according to Invention (1).

FIG. 5 is a cross-sectional view schematically showing a seal effective region A. The seal effective region A is a region in which the inner peripheral wall 19 of the seal space and the outer seal member 32 are in close contact with each other to prevent the high-pressure fluid from leaking. In the example shown in FIGS. 1 to 4, one outer seal member 32 is provided, but in a valve equipped with two or more outer seal members, the seal effective region A is a seal region of the outer seal member 32 closest to the seal opening space among the plurality of outer seal members 32.

First Embodiment of Invention (2)

Figure 6:
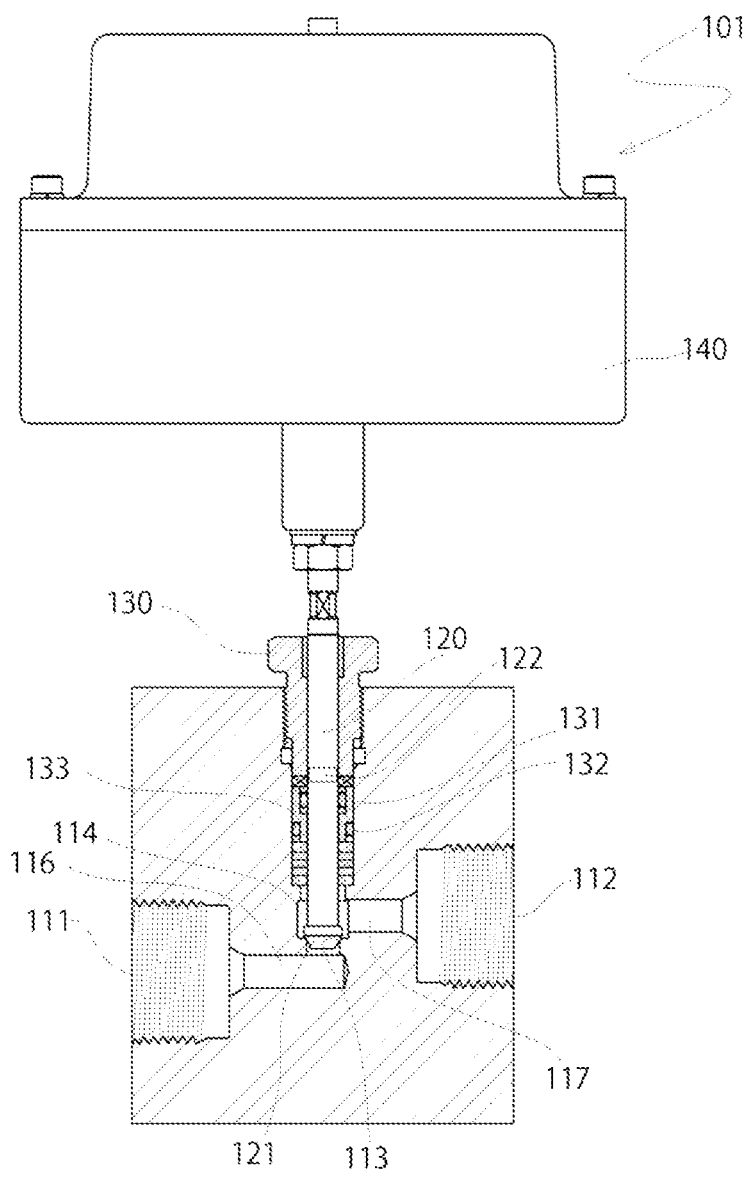
FIG. 6 is a front sectional view of a partly cut-away portion showing a valve according to Invention (2).

FIGS. 6 to 9 show a first embodiment in Invention (2). FIG. 6 is a front sectional view of a partly cut-away portion of a valve 101 according to Invention (2). An inflow port 111 into which the fluid flows and an outflow port 112 through which the fluid flows out are opened on an outer surface of a valve body 110 of the valve 101 according to Invention (2). The inflow port 111 and a valve chamber 114 in which the fluid is controlled communicate with each other by a fluid inflow passage 116, and the valve chamber 114 and the inflow port 111 communicate with each other by a fluid outflow passage 117. A valve seat 113 is formed at an open end of the fluid inflow passage 116 of the valve chamber 114, and abuts against and moves away from a valve element 121 formed at a lower end of a stem 120 to control opening and closing of the fluid. A seal pressing member 130 that presses a seal is screwed on an upper surface side of the valve body 110. An actuator 140 that drives the stem 120 up and down is coupled to the stem 120, and is provided above the valve body 110.

In the stem 120 of the valve 101 according to the present embodiment, in an assembled state, an outer diameter D1 of a portion of the stem 120 that is nearer to the seal pressing member 130 than is a position at which the seal members 131 and 132 are in sliding contact is smaller than an outer diameter D of the other portions of the stem 120, and the portion forms a pressure release portion 122.

Figure 7A:
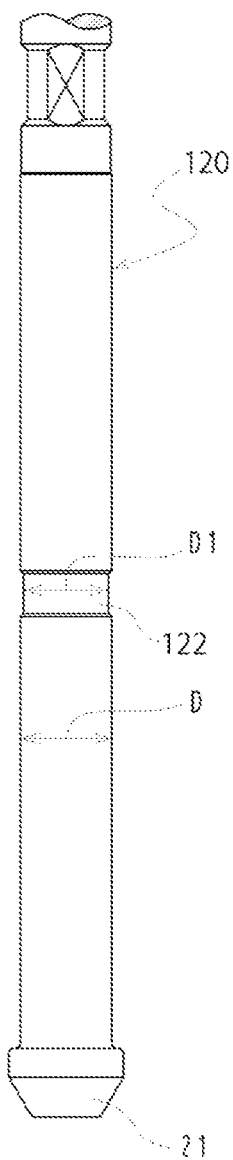

FIG. 7A is a front view of a partly cut-away portion of the stem 120 of the valve 101 according to Invention (2). A length of the pressure release portion 122 in an axial direction is not particularly limited, but is set to be about an axial length of a portion of a seal holding member 133 that has an inner diameter d2 and in which the inner seal member 131 is housed.

The seal member according to Invention (2) is implemented by attaching the inner seal member 131 and the outer seal member 132 to the continuous cylindrical seal holding member 133 having different outer diameters and inner diameters, and is attached to the stem 120 such that the inner seal member 131 is on the actuator 140 side.

Figure 7B:
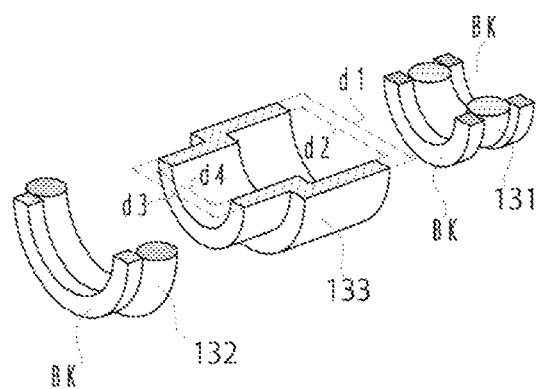
Figure 7C:
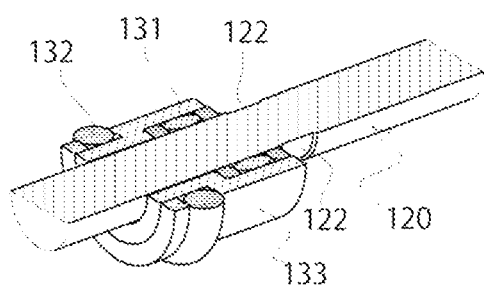

Specifically, as shown in FIG. 7B, in the continuous cylindrical seal holding member 133 having different outer diameters and inner diameters, a portion having an outer diameter d1 and the inner diameter d2 to which the inner seal member 131 is attached and a portion having an outer diameter d3 and an inner diameter d4 to which the outer seal member 132 is attached are continuous and integrally formed. The outer diameter d1 is slightly smaller than an inner diameter of a seal space 119 of the valve body 110 that will be described later, and the inner diameter d4 is slightly larger than the outer diameter D of the stem 120. The seal holding member 133 is fitted onto the stem 120 in a state in which the seal members 131 and 132 and a plurality of backup rings BK are attached, and is fitted into the seal space.

Figure 8:
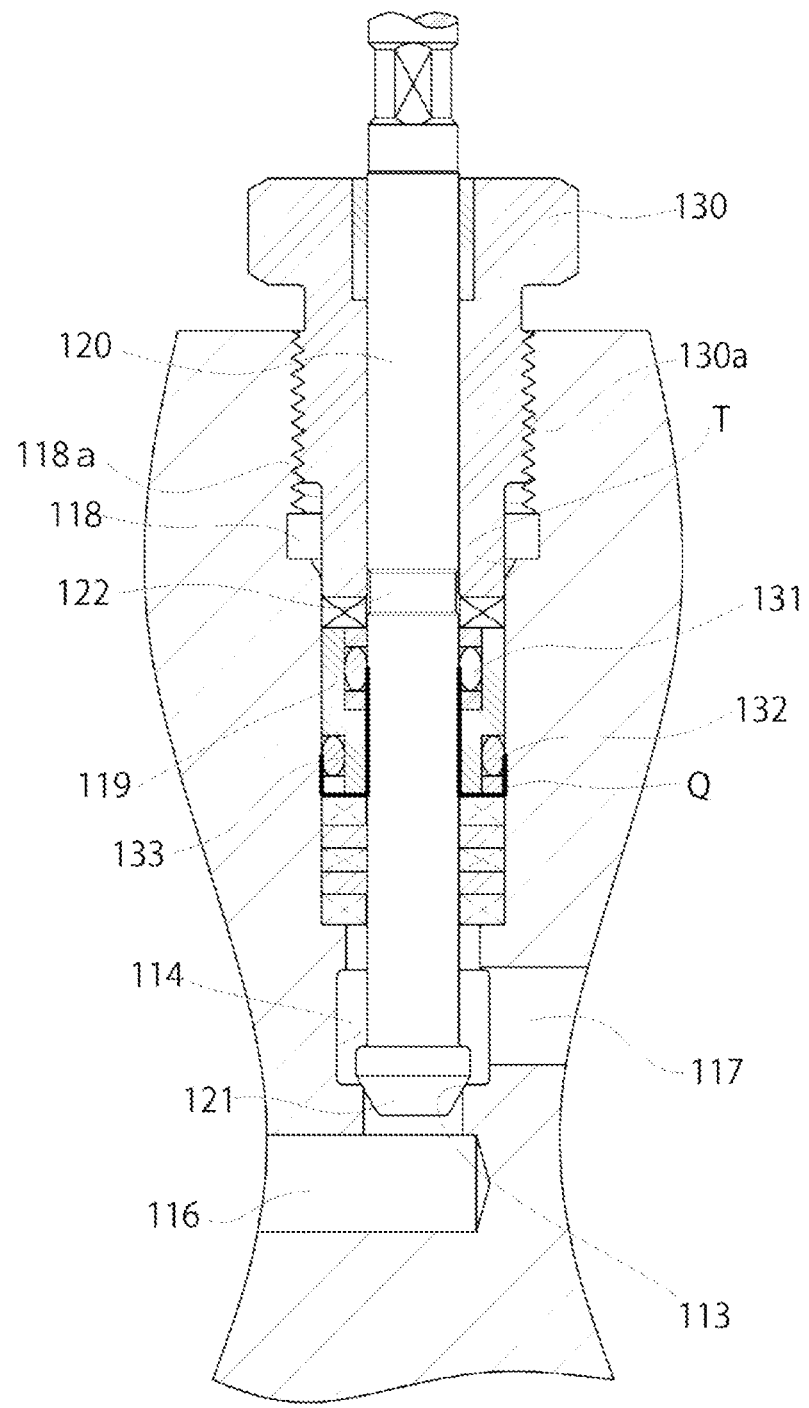
FIG. 8 is an enlarged view of main parts of the valve according to Invention (2), and is an enlarged front sectional view of a partly cut-away portion showing a state in which the seal pressing member is fastened.

FIG. 8 is an enlarged front sectional view of a partly cut-away portion showing a state in which the seal pressing member 130 is fastened to a prescribed position in the valve 101 according to Invention (2). A male screw 130a of the seal pressing member 130 is screwed into a female screw 118a formed in a seal opening space 118 in an upper portion of the valve body 110. The inner seal member 131 is in sliding contact with a periphery of the stem 120 to prevent the fluid from leaking along the outer peripheral surface of the stem 120.

A tapered surface T is formed above the seal space 119. The seal opening space 118 is formed above the tapered surface T. A space below the tapered surface T and above the valve chamber 114 is the seal space 119 in which an outer seal member 132 attached to the seal holding member 133 is provided. The outer seal member 132 is in close contact with an inner peripheral wall forming the seal space 119, to prevent the fluid from the valve chamber 114 from leaking along the inner peripheral wall forming the seal space 119. Q indicated by a thick line indicates pressure accumulation in which the high-pressure fluid from the valve chamber 114 accumulates. A space from the valve chamber 114 side to a seal portion of the inner seal member 131 and the outer seal member 132 is a space (gap) of the pressure accumulation portion Q.

Figure 9:
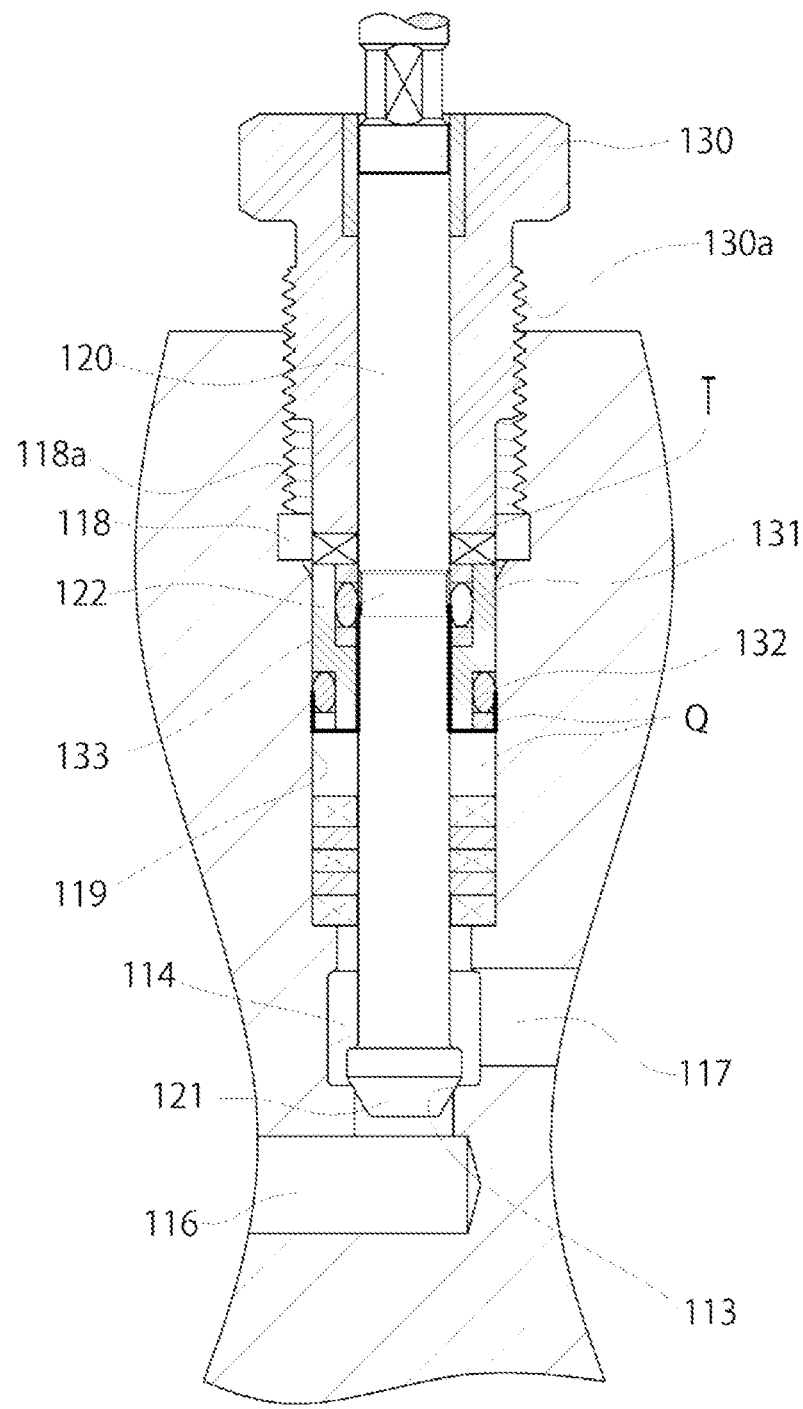
FIG. 9 is an enlarged front sectional view of a partly cut-away portion showing a state in which the seal pressing member of the valve according to Invention (2) is loosened.

FIG. 9 shows a state in which the inner seal member 131 and the outer seal member 132 moves upward by loosening screwing of the male screw 130a of the seal pressing member 130 in a pressure release step before retightening. Since the seal holding member 133 holding the seal members 131 and 132 is biased toward the seal pressing member 130 by pressure in the pressure accumulation portion Q, the seal holding member 133 is lifted together with the seal pressing member 130 by loosening the male screw 130a. When the male screw 130a is loosened to the position shown in FIG. 9, a seal surface of the inner seal member 131 reaches the small-diameter pressure release portion 122, and the high-pressure fluid in the pressure accumulation portion Q is discharged from the seal of the inner seal member 131, passes through a gap between an inner surface of the seal pressing member 130 and an outer surface of the stem 120, and is discharged to the outside of the valve 101. Therefore, the pressure in the valve chamber 114 decreases, and when retightening is performed again, the male screw 130a of the seal pressing member 130 can be lightly tightened.

Even when the seal pressing member 130 is loosened, an outer periphery of the outer seal member 132 abuts against the inner peripheral wall of the seal space 119, and thus the outer seal member 132 is not damaged.

Second Embodiment of Invention (2)

Figure 10A:
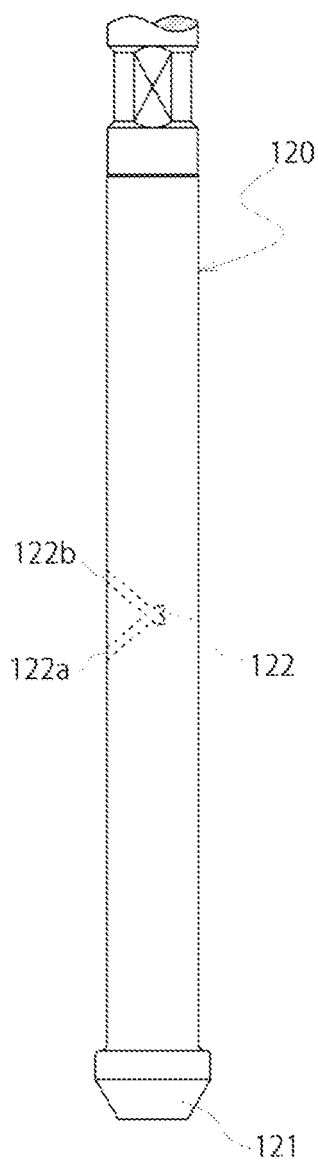
Figure 10B:
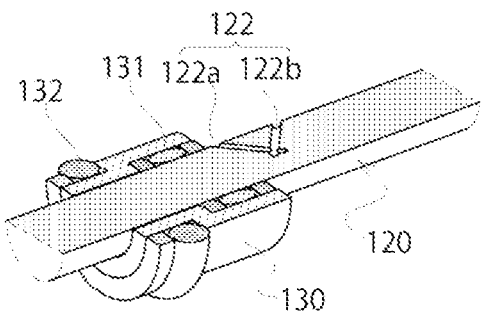
Figure 10C:
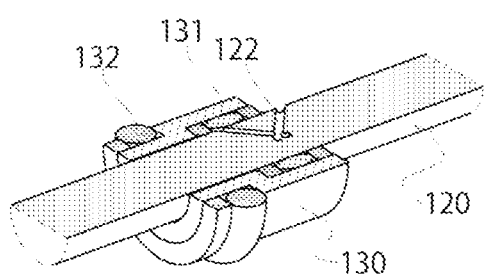
Figure 10D:
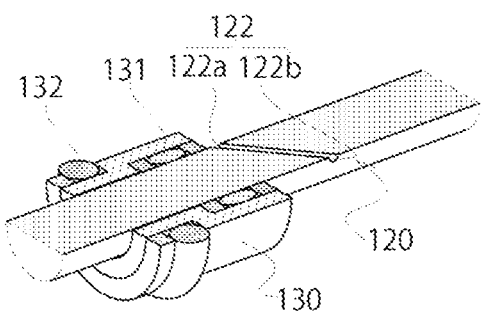
Figure 11A:
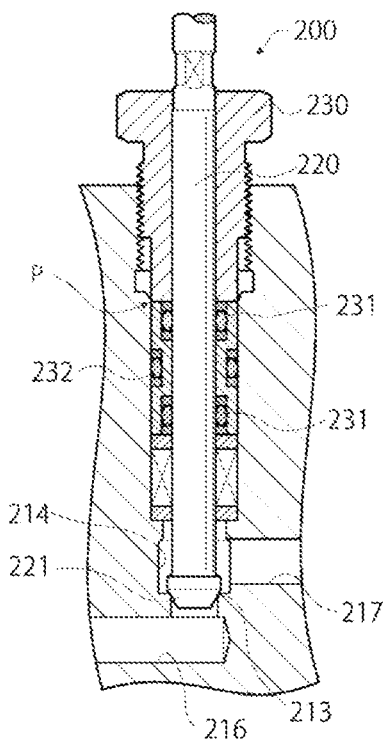
FIGS. 11A, 11B and 11C show shows a state FIG. 11A in which a seal member of a valve in the related art is fastened, a state FIG. 11B in which the seal member is slightly loosened, and a state FIG. 11C in which the seal member is opened.
Figure 11B:
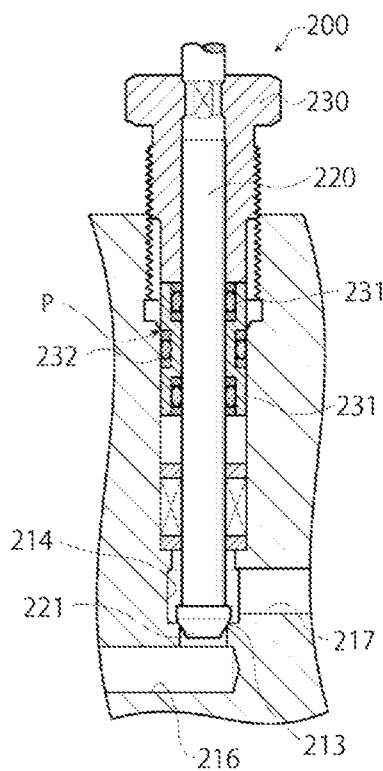
Figure 11C:
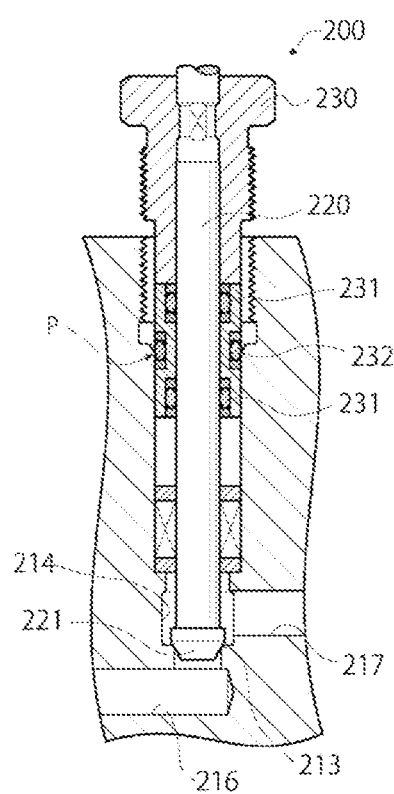
Figure 12A:
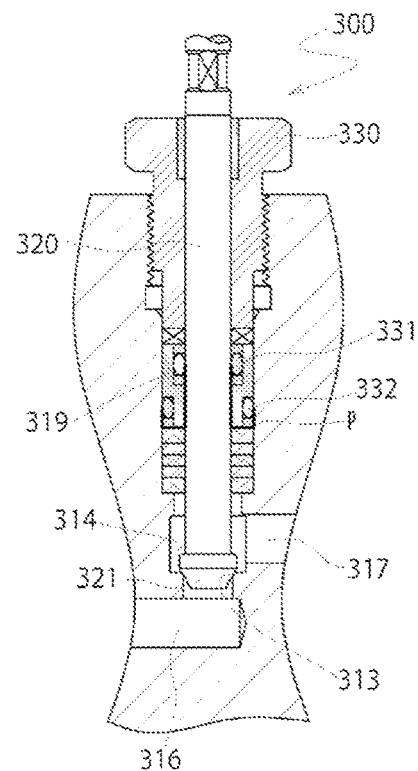
Figure 12B:
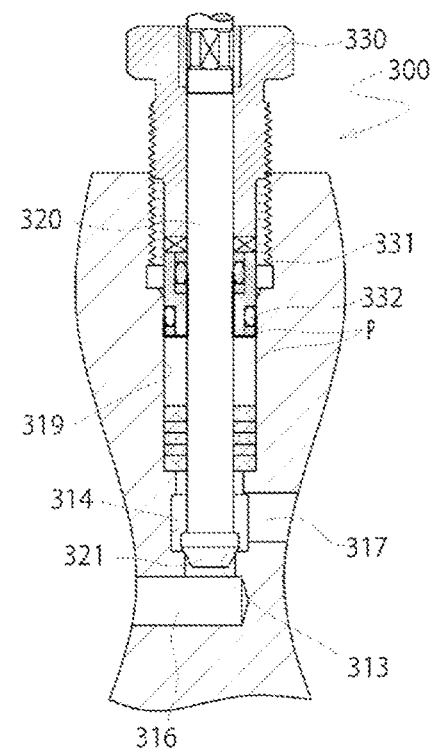
Figure 12C:
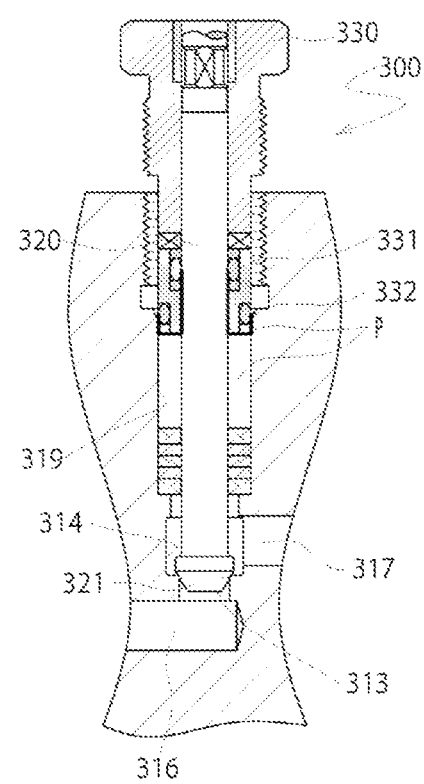

FIGS. 10A, 10B and 10C show a second embodiment of Invention (2). The second embodiment is the same as the first embodiment except for the structure of the pressure release portion 122, and thus the description thereof is omitted.

As shown in FIG. 10A, the pressure release portion 122 of the valve 101 according to Invention (2) has an inflow hole 122a and an outflow hole 122b that communicate with each other inside the stem 120.

The inflow hole 122a of the pressure release portion 122 is always positioned nearer to the seal pressing member 130 than is the inner seal member 131, and the pressure (high-pressure fluid in the pressure accumulation portion Q) in the valve chamber 114 does not leak to the outside (see FIG. 10B.

In the pressure release step before the retightening, since the seal holding member 133 holding the seal members 131 and 132 is biased toward the seal pressing member 130 by the pressure in the pressure accumulation portion Q, the seal holding member 133 is lifted together with the seal pressing member 130 by loosening the male screw 130a. As shown in FIG. 10C, when the seal portion of the inner seal member 131 passes over the inflow hole 122a as the seal holding member 133 lifts, the high-pressure fluid in the pressure accumulation portion Q is discharged from the inflow hole 122a to the outside through the outflow hole 122b via a communication passage in the stem. Accordingly, the pressure in the valve chamber 114 decreases, and when retightening is performed again, the male screw 130a of the seal pressing member 130 can be lightly tightened.

This international application claims priority based on Japanese Patent Application No. 2020-078892 filed on Apr. 28, 2020 and priority based on Japanese Patent Application No. 2020-216537 filed on Dec. 25, 2020, and entire contents of Japanese Patent Application No. 2020-078892 and Japanese Patent Application No. 2020-216537 are incorporated into this international application.

INDUSTRIAL APPLICABILITY

When the pressure accumulated near the seal member is released to the outside, the valve according to the invention can surely release the pressure even when the seal pressing member is slightly loosened and a movement distance of the seal member is reduced, and thus the valve can be suitably used as a valve in a high-pressure environment, for example, a hydrogen station. In the valve according to the invention, since it is not necessary to change the valve body by performing a modification in which a leak port called the leak hole is formed or by using the stem in which the pressure release portion is formed, the valve can be suitably used for maintenance and modification of existing equipment.

REFERENCE SIGN LIST 1, 101 valve
10 valve box 11 fluid inlet
12 fluid outlet
13, 113 valve seat
14, 114 valve chamber
15 leak hole
16, 116 fluid inflow passage
17, 117 fluid outflow passage
18 female screw
19 inner peripheral wall
20, 120 stem
21, 121 valve element
30, 130 seal pressing member
30a male screw
31 inner seal member
32 outer seal member
40, 140 actuator
110 valve body
111 inflow port
112 outflow port
118 seal opening space
118a female screw
119 seal space
122 pressure release portion
130a male screw
131 inner seal member
132 outer seal member
133 seal holding member
P boundary position of seal opening space and seal space
Q pressure accumulation portion

The invention claimed is:

1. A valve comprising:
a valve body having an inflow port and an outflow port for a fluid, and a valve chamber;
a valve seat provided in the valve chamber and having a seat surface that is an open end of a flow passage communicating with the inflow port;
a columnar stem connected to an actuator and including, at a tip end of the stem, a valve element configured to abut against and move away from the seat surface due to an operation of the actuator;
a seal member provided in a seal space that communicates with the outside from the valve chamber, fitted onto the stem, and configured to prevent the fluid from leaking from the valve chamber; and
a seal pressing member configured to press and fix the seal member to a valve chamber side, wherein
the seal member is implemented by attaching an inner seal member and an outer seal member to a continuous cylindrical seal holding member, and the inner seal member is on a side of the actuator, and
the stem is formed with, in an assembled state, a pressure release portion that is nearer to the seal pressing member than is a position at which the seal member is in sliding contact and the pressure release portion is formed at the position that overlaps the inner seal member when the seal pressing member is loosened.

2. The valve according to claim 1, wherein
the pressure release portion has an outer diameter of the stem smaller than an outer diameter of the other part of the stem.

3. The valve according to claim 2, wherein
the seal member is implemented by attaching the inner seal member and the outer seal member to the continuous cylindrical seal holding member having different outer diameters and inner diameters, and the inner seal member is on the side of the actuator.

4. The valve according to claim 1, wherein
the pressure release portion is an inflow hole and an outflow hole that communicate with each other inside the stem.

5. The valve according to claim 4, wherein
the seal member is implemented by attaching the inner seal member and the outer seal member to the continuous cylindrical seal holding member having different outer diameters and inner diameters, and the inner seal member is on the side of the actuator.

* * * * *